United States Patent
Benson et al.

(10) Patent No.: US 8,892,945 B2
(45) Date of Patent: Nov. 18, 2014

(54) EFFICIENT APPLICATION MANAGEMENT IN A CLOUD WITH FAILURES

(75) Inventors: Theophilus Benson, Madison, WI (US); Yaoping Ruan, Yorktown Heights, NY (US); Sambit Sahu, Yorktown Heights, NY (US); Anees A. Shaikh, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 252 days.

(21) Appl. No.: 13/437,467

(22) Filed: Apr. 2, 2012

(65) Prior Publication Data

US 2013/0262923 A1    Oct. 3, 2013

(51) Int. Cl.
    *G06F 11/00*    (2006.01)
(52) U.S. Cl.
    USPC .......................................................... 714/15
(58) Field of Classification Search
    CPC . G06F 17/30194; G06F 12/00; G06F 9/4856; G06F 11/1438; G06F 11/1482; G06F 9/5072; H04L 12/24; H04L 29/08
    USPC ........................................................ 714/1–57
    See application file for complete search history.

(56) References Cited

U.S. PATENT DOCUMENTS

| | | | |
|---|---|---|---|
| 8,332,688 B1 * | 12/2012 | Tompkins | 714/13 |
| 8,341,363 B2 * | 12/2012 | Chou et al. | 711/162 |
| 2009/0300169 A1 * | 12/2009 | Sagar et al. | 709/224 |
| 2011/0276951 A1 * | 11/2011 | Jain | 717/140 |
| 2012/0089972 A1 * | 4/2012 | Scheidel et al. | 717/168 |
| 2012/0297238 A1 * | 11/2012 | Watson et al. | 714/4.11 |
| 2013/0227335 A1 * | 8/2013 | Dake et al. | 714/4.2 |

\* cited by examiner

*Primary Examiner* — Nadeem Iqbal
(74) *Attorney, Agent, or Firm* — F. Chau & Associates, LLC; Louis J. Percello, Esq.

(57) ABSTRACT

A semiconductor device includes a first layer, first and second active areas disposed on the first layer; a trench disposed between the first and second active areas, an insulating oxide that fills the trench to a level below a surface of the first and second active layers, and a nitride cap disposed on top of the insulating oxide so that the first and second active areas can be cleaned without damaging the insulating oxide. A top surface of the nitride cap in regions adjacent to the first and second active areas in aligned with a top surface of the first and second active areas, a top surface of the nitride cap in a center region of the nitride cap is stepped below the top surface of the adjacent regions, and a void is formed between the top surface regions adjacent to the first and second active areas.

8 Claims, 4 Drawing Sheets

EFFICIENT APPLICATION MANAGEMENT IN A CLOUD WITH FAILURES

TECHNICAL FIELD

The present disclosure is directed to software application management in cloud computing environments.

BACKGROUND

Cloud infrastructure services, also known as Infrastructure as a Service (IaaS), deliver computer infrastructure—typically a platform virtualization environment—as a service, along with raw (block) storage and networking. Rather than purchasing servers, software, data-center space or network equipment, clients instead buy those resources as a fully outsourced service. A powerful abstraction supported by cloud computing is resource level abstraction by means of virtualizing the underlying physical resources. In this paradigm, users are relieved of the trouble of owning and managing physical computing resources. Instead, users can request computing resources from cloud providers using the provider's exposed APIs. One such example is Amazon's EC2, through which users can gain access to the desired computing resources. The users do not have any control over the physical resources, as the cloud provider provides a set of virtualized resources, such as servers/CPUs, storage and network bandwidth. In such a computing model, users are required to prepare the virtual images that will host the applications, known as virtual appliances. The benefit of such a model is that users are unaware of the underlying physical computing resources and do not need to manage the physical resources. The user's focus is on managing applications on top of these virtual resources. Due to the sharing of a common set of physical resources that are isolated by virtualization technologies, cloud providers can significantly lower the cost of computing resources. However managing applications in such a paradigm still poses a challenge for users. For example, in the advent of physical resource failures, users lack resiliency at the application level, and a hosted application or instance can be lost.

BRIEF SUMMARY

Exemplary embodiments of the invention as described herein generally include methods and systems for enabling users to manage their applications in the event of physical resource failures as well as some level of virtual resource level failures, and assumes little support from the cloud providers for application management.

According to an aspect of the invention, there is provided a method of deploying a software application on the Internet cloud that is failure-tolerant, including identifying those aspects of a software application that need to be persisted in the event of failure, and those aspects of the application that do not need to be persisted, and deploying the application so that aspects that need to be persisted are deployed to persistent storage and aspects that do not need to be persisted are deployed to non-persistent virtual partitions, where when a virtual partition or an application component fails, an instance of the application is recreatable from those application aspects that were deployed to persistent storage.

According to a further aspect of the invention, the method includes, when a virtual partition or an application component fails, redeploying the application, recovering persisted application aspects from persistent storage, and applying the recovered persistent aspects to the redeployed application, whereby the application state prior to the partition or component failure is recreated.

According to a further aspect of the invention, application aspects that need to be persisted include data and stateful information that defines or is associated with an application state, and application aspects that do not need to be persisted include executable code and stateless information.

According to a further aspect of the invention, identifying those aspects of a software application that need to be persisted and those aspects of the application that do not need to be persisted further comprises using application specific knowledge.

According to a further aspect of the invention, the method includes saving to persisted storage any changes to application data and any changes to a state of the application.

According to another aspect of the invention, there is provided a non-transitory program storage device readable by a computer, tangibly embodying a program of instructions executed by the computer to perforin the method steps for deploying a software application on the Internet cloud that is failure-tolerant.

DETAILED DESCRIPTION

Figure 1:
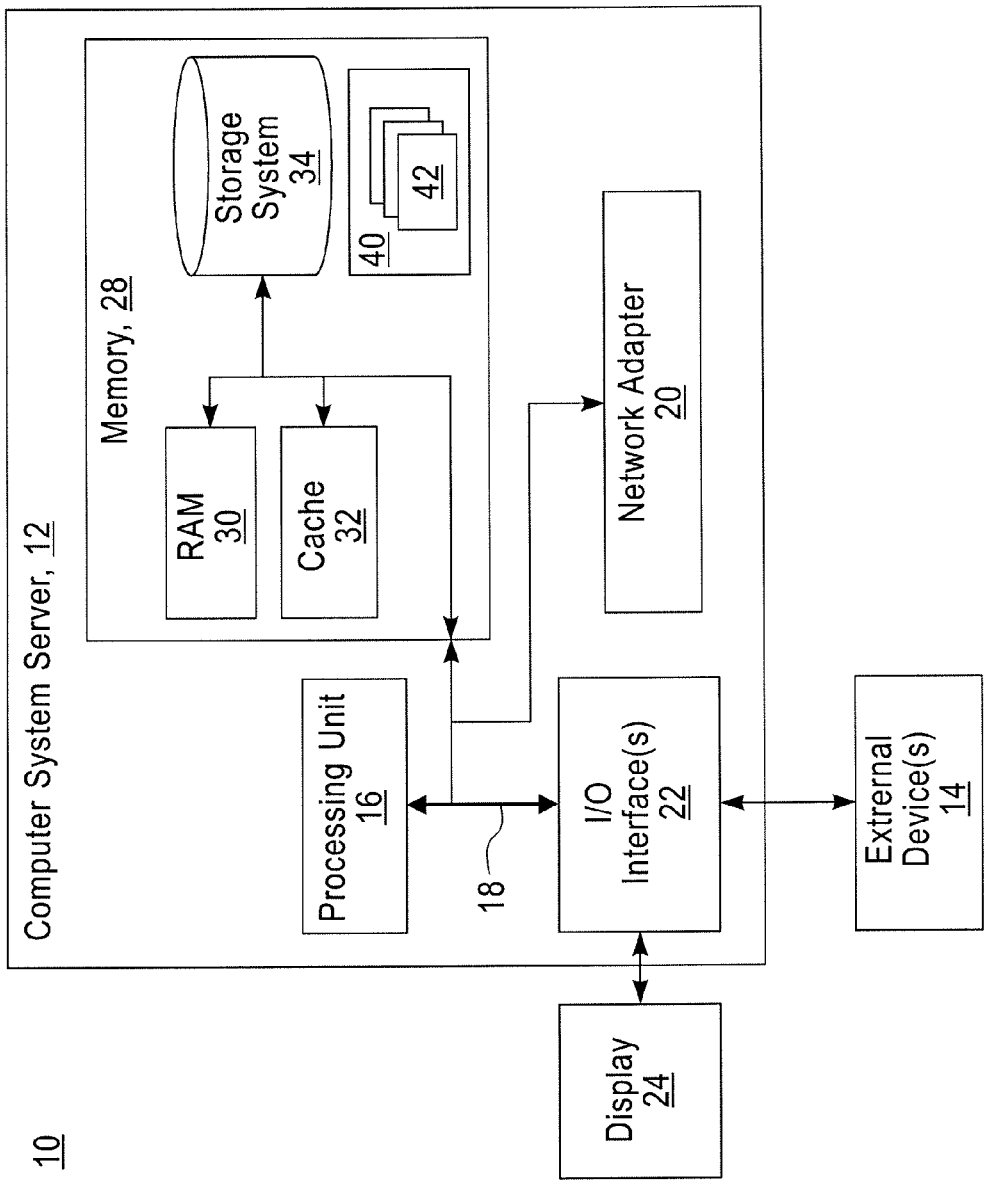
FIG. 1 depicts a cloud computing node according to an embodiment of the present invention.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
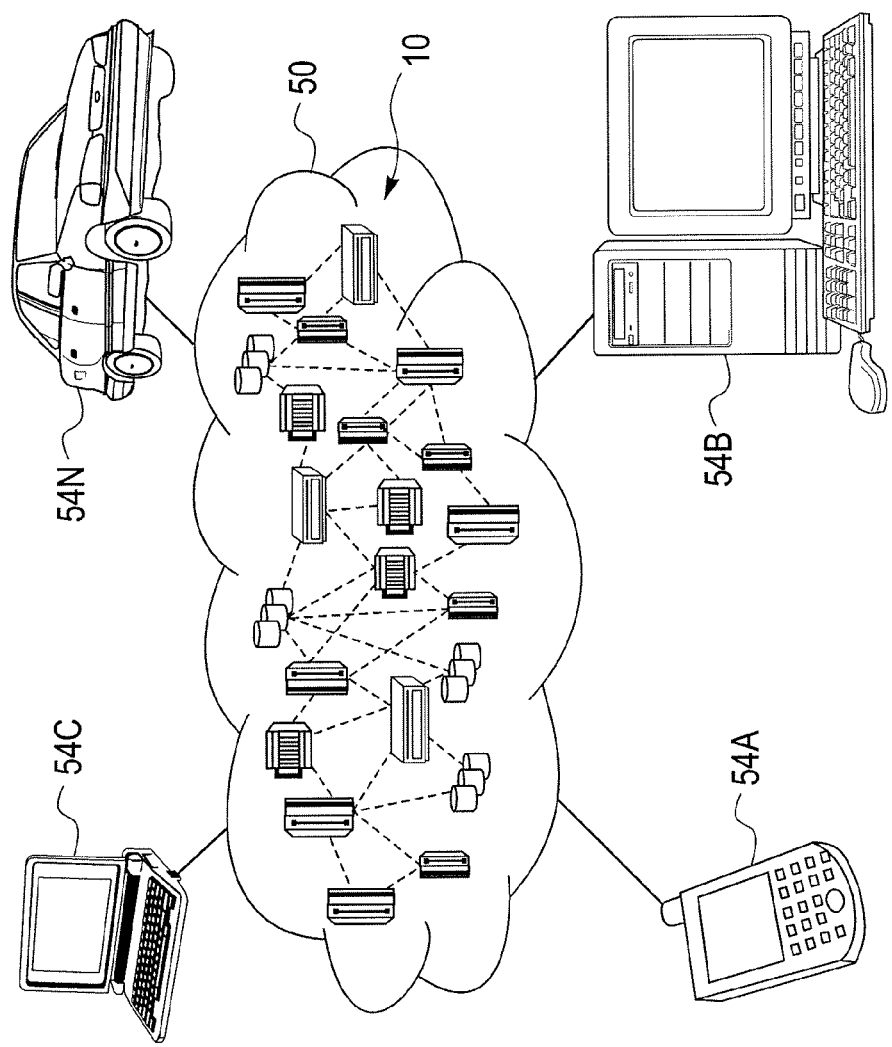
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
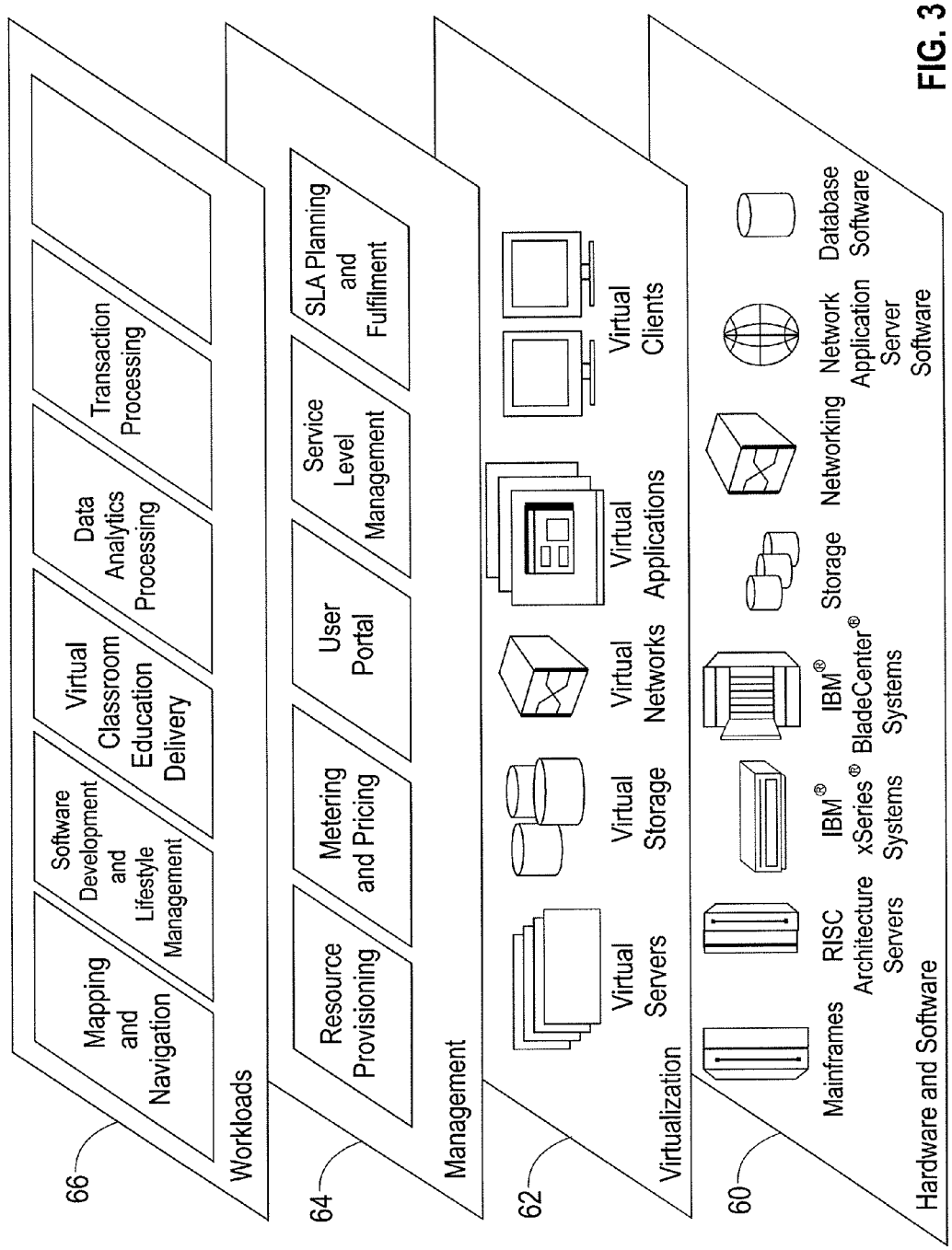
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide). Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; and transaction processing.

Embodiments of the invention provides users with mechanisms for deploying their application in such a way that important state information, such as configurations and data, are persisted in appropriate storage for possible retrieval in the future. Embodiments of the invention provides users with mechanisms to re-engineer and construct the deployment process such that a virtual machine (VM) instance can be restored after a failure with very minimal support from a cloud provider. Application components can be mapped in the deployment plan onto cloud resource elements, to account for availability/persistent nature of cloud elements and application requirements.

A method according to an embodiment of the invention includes 3 steps: (1) identifying cloud components of an application in terms of service quality, that is, those that are persistent and those that are not; (2) identifying those components of an application that need to be persisted, and those that do not, and splitting the application accordingly; and (3) mapping these application components into cloud elements and linking these post deployment. The application is deployed so that either the persistent information is mounted to storage partitions that are hosted on persisted storage, or only image binaries that are part of the generic virtual appliance images are kept in the virtual machines (VMs). If the VM goes down either due to virtual machine or underlying physical resource problems, the user can recover the application with very little support from the cloud. The user only requires support to recover the persisted information and apply these changes to the original virtual appliance to reconfigure the application with the correct configuration state and persisted data. Embodiments of the invention can structure the storage partition management appropriately, for example by using application models that are built from a knowledge base, so that it knows which partitions are configuration related, and what data needs to be persisted. Embodiments of the invention can transparently map these at the application provisioning phase (see below) and persist this information, and can enable the service provider to recover this persisted information. When an application needs to be restored, it recovers this required information and modifies the appropriate information to synchronize with the recovered information.

According to an embodiment of the invention, two primitives allow users to manage their applications in the event of underlying cloud resource failures, as described below.

(1) Application Provisioning Phase: A cloud deployment pattern engine intercepts a user's request for application deployment and instruments the deployment in such a way that persistent storage is used for any stateful information and for directories that keep track of configuration level information as well as any data that is required to be persisted for future use. The cloud deployment pattern engine maps stateful components into cloud elements that are persisted, and stateless components into cheaper, non-persistent cloud elements. Typically, stateful components include data, whereas the application executable code would be considered stateless. For example, for an Apache HTTP server, the binaries that are bundled as a virtual appliance can always be downloaded from the cloud, or user based images for the applications. Only a few directories that keep track of configurations, such as in/conf, and any user created data files, such as contents in /httpdocs, are mounted to persistent storage. Thus any changes made by users to these directories are always kept in recoverable storage. There are generally three type of storage, determined by cost and functionality: (1) local storage on the VM itself, which is not persistent; (2) block level storage, such as Amazon EBS; and (3) object based storage, such as Amazon S3 and Google Storage. Metadata may be sued to determine in which type of storage data should be stored. The metadata will be provided as an API to the Cloud deployment pattern engine by each application stack. Alternatively, the metadata could be based on best practices, and a database could be created for each application to keep such information. For example, if the application is DB2, DB2 experts will list the set of files that need to be persisted, and this set of files will maintain the configuration state that will be used to recreate the state of the application for recovery later on. Knowledge about which directories need to be persisted may be derived from a knowledgebase or with some lower level discovery mechanism. The cloud deployment pattern engine can transparently work with cloud instance creation APIs to facilitate this pattern in the provisioning phase. After a user has customized an application or made changes to an application state, a snapshot of the application state can be created to create a virtual backup copy of the application. Many cloud providers provide APIs to create such snapshots, which can be customized to automatically create a snapshot at certain frequencies. The golden image can be created by the cloud provider as a set of base mages that a customer uses to start an installation.

(2) Application Redeployment Phase: In the event of any underlying VM or cloud resource failure, a cloud redeployment pattern engine can recover the persisted information and binary images from an image repository and apply these changes to the applications if the application needs to be reinstalled. The cloud redeployment pattern engine remaps persisted elements onto newly created deployments, and stateless components are redeployed using golden images. The redeployment pattern engine uses the golden image from the application catalog. For example, if DB2 has to restored, it takes the DB2 golden images. From the metadata about which files keep the state of DB2, the redeployment pattern engine learns which links to establish to point to those files/directories. The redeployment pattern engine either rewrites these files in the golden image or creates links to these saved files to recreate the state. It obtains the binary images from the image repository and persisted information from cloud persistent storage. Using both of this information, it patches the instantiated image with the changes to bring the application back into the correct state.

According to an embodiment of the invention, in an instance creation phase, the cloud deployment pattern engine intercepts a users request to create an image instance. The cloud deployment pattern engine uses application specific knowledge to determine which information needs to be persisted and, at the create instance phase, uses this knowledge for application deployment. Thus, any changes to the state and data are saved to storage that is persisted beyond the instance life cycle.

For example, a user chooses a service and specifies deployment parameters. A service mapper maps the user requirements into an image specific deployment plan. A cloud deployment pattern engine according to an embodiment of the invention uses best practices template or business resiliency specific solutions to annotate the deployment plan into two specific categories for each elements: (1) stateful requirements; and (2) stateless requirements.

A trigger for recreating the application occurs if, for example, the VM stops responding, or a physical resource has failed. In both cases, the hosted application will fail. According to an embodiment of the invention, in an instance recreation phase, the cloud redeploy pattern engine can recreate an instance of the application and restore the instance to its last known state. The cloud redeploy pattern engine can obtain the appropriate binary images from the user or a cloud repository, and can obtain persisted state information by using the pattern knowledge kept in the knowledgebase at the deployment phase. The cloud redeploy pattern engine then recreates the instance and applies changes using the recovered information.

Figure 4:
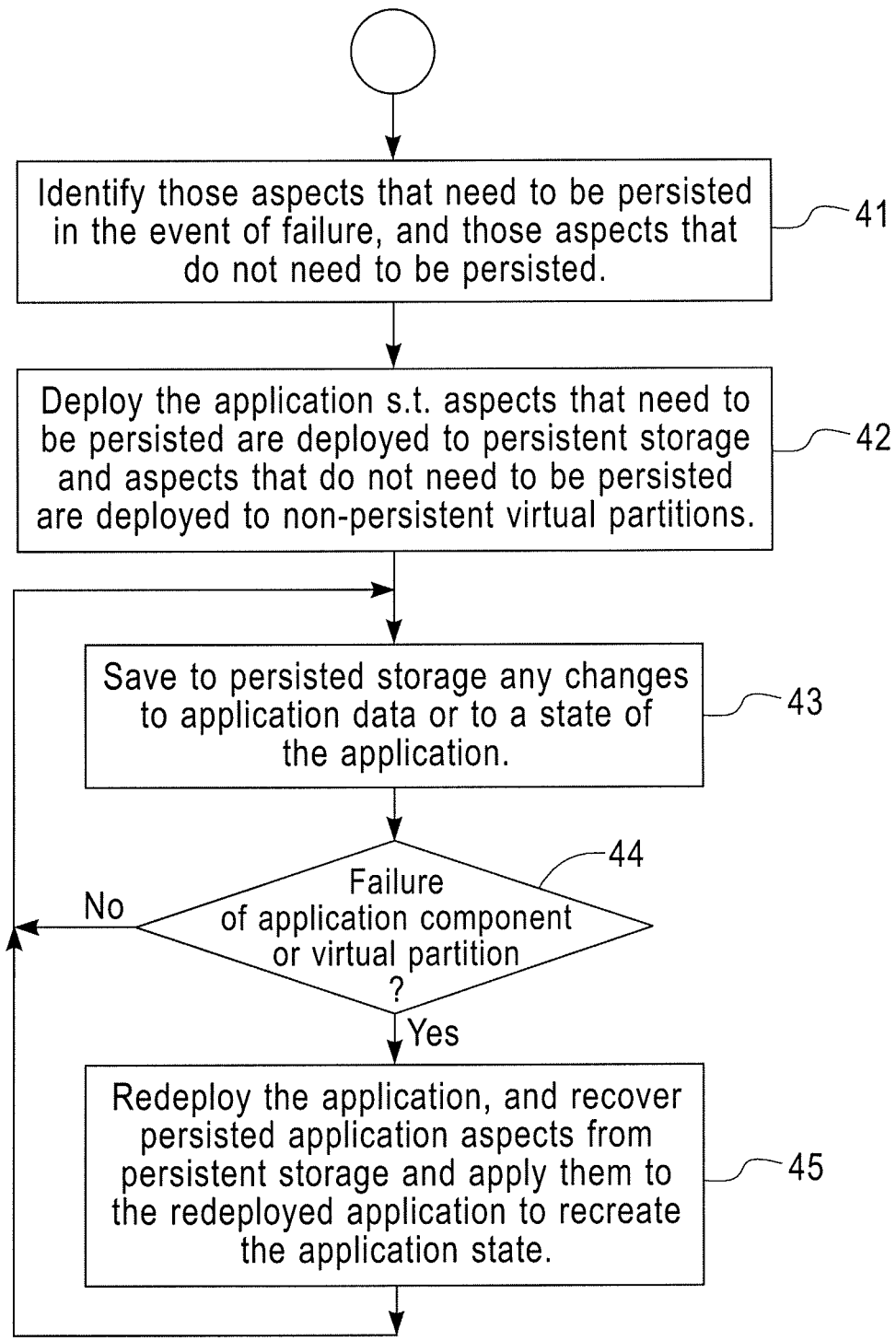
FIG. 4 is a flowchart of a method of deploying a cloud application that allows for recovery in case of a failure, according to an embodiment of the invention.

FIG. 4 is a flowchart of a method according to an aspect of the invention for deploying a software application on the Internet cloud that is failure-tolerant. Referring now to the figure, a method according to an aspect of the invention begins at step 41 by identifying those aspects of the application that need to be persisted in the event of failure, and those aspects of the application that do not need to be persisted. Application specific knowledge can be used to help identify those aspects of a software application that need and do not need to be persisted. Application aspects that need to be persisted include data and stateful information that defines or is associated with an application state, and aspects that do not need to be persisted include executable code and stateless information. At step 42, the application is deployed so that aspects that need to be persisted are deployed to persistent storage and aspects that do not need to be persisted are deployed to non-persistent virtual partitions. While the application is running, any subsequent changes to the application data or to a state of the application are saved to persisted storage at step 43. If, however, at step 44, a virtual partition or an application component fails, an instance of the application is recreatable from those application aspects that were deployed to persistent storage. In particular, at step 45, the application is redeployed, and persisted application aspects are recovered from persistent storage and applied to the redeployed application to recreate the application state prior to the failure.

While exemplary embodiments of the invention has been described in detail with reference to the attached drawing figures, those skilled in the art will appreciate that various modifications and substitutions can be made thereto without departing from the spirit and scope of the embodiments of the invention as set forth in the appended claims.

What is claimed is:

1. A method of deploying a software application on the Internet cloud that is failure-tolerant, comprising the steps of:
   identifying those aspects of a software application that need to be persisted in the event of failure, and those aspects of the application that do not need to be persisted, wherein metadata received from the application is used to determine in which type of storage the persistent aspects and non-persistent aspects should be stored, and application aspects that need to be persisted include data and stateful information that defines or is associated with an application state, and application aspects that do not need to be persisted include executable code and stateless application components; and
   deploying the application wherein aspects that need to be persisted are deployed to persistent cloud storage and aspects that aspects that do not need to be persisted are deployed to non-persistent virtual partitions,
   wherein when a virtual partition or an application component fails, an instance of the application is recreatable from those application aspects that were deployed to persistent storage.

2. The method of claim 1, further comprising, when a virtual partition or an application component fails, redeploying the application, recovering persisted application aspects from persistent storage, and applying the recovered persistent aspects to the redeployed application, whereby the application state prior to said partition or component failure is recreated.

3. The method of claim 1, wherein identifying those aspects of a software application that need to be persisted and those aspects of the application that do not need to be persisted further comprises using application specific knowledge.

4. The method of claim 1, further comprising saving to persisted storage any changes to application data and any changes to a state of the application.

5. A non-transitory program storage device readable by a computer, tangibly embodying a program of instructions executed by the computer to perform the method steps for deploying a software application on the Internet cloud that is failure-tolerant, comprising the steps of:
   identifying those aspects of a software application that need to be persisted in the event of failure, and those aspects of the application that do not need to be persisted, wherein metadata received from the application is used to determine in which type of storage the persistent aspects and non-persistent aspects should be stored, and application aspects that need to be persisted include data and stateful information that defines or is associated with an application state, and application aspects that do not need to be persisted include executable code and stateless application components; and
   deploying the application wherein aspects that need to be persisted are deployed to persistent cloud storage and aspects that aspects that do not need to be persisted are deployed to non-persistent virtual partitions,
   wherein when a virtual partition or an application component fails, an instance of the application is recreatable from those application aspects that were deployed to persistent storage.

6. The computer readable program storage device of claim 5, the method further comprising, when a virtual partition or an application component fails, redeploying the application, recovering persisted application aspects from persistent storage, and applying the recovered persistent aspects to the redeployed application, whereby the application state prior to said partition or component failure is recreated.

7. The computer readable program storage device of claim 5, wherein identifying those aspects of a software application that need to be persisted and those aspects of the application that do not need to be persisted further comprises using application specific knowledge.

8. The computer readable program storage device of claim 5, the method further comprising saving to persisted storage any changes to application data and any changes to a state of the application.

* * * * *